(12) United States Patent
Matsumura et al.

(10) Patent No.: US 6,470,739 B1
(45) Date of Patent: Oct. 29, 2002

(54) SENSOR MOUNTING STRUCTURE AND SEMICONDUCTOR PRESSURE SENSOR FOR MOTOR VEHICLES

(75) Inventors: Takafumi Matsumura, Hitachinaka; Atsushi Miyazaki, Mito; Shinichi Yamaguchi; Hiroyuki Tanaka, both of Hitachinaka, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/421,268

(22) Filed: Oct. 20, 1999

(30) Foreign Application Priority Data

Oct. 20, 1998 (JP) .......................................... 10-298104

(51) Int. Cl.⁷ .......................................... G01M 15/00
(52) U.S. Cl. ................................. 73/118.2; 73/119 R
(58) Field of Search ................... 73/116, 117.2, 73/117.3, 118.1, 118.2, 119 R; 279/19.3, 906

(56) References Cited

U.S. PATENT DOCUMENTS 5,261,272 A * 11/1993 Rush et al. ................. 73/118.2
6,067,958 A *  5/2000 Kamimura et al. ......... 123/337

FOREIGN PATENT DOCUMENTS

| JP | 63-215846 A | 9/1988 |
| JP | 63-215847 A | 9/1988 |
| JP | 5-172673 A | 7/1993 |
| JP | 10122914 A | 5/1998 |

OTHER PUBLICATIONS

European Search Report, Appln No. 99120080.9, Oct. 24, 2000 (in English).

* cited by examiner

Primary Examiner—Eric S. McCall
(74) Attorney, Agent, or Firm—Crowell & Moring LLP

(57) ABSTRACT

To provide a sensor mounting structure which enables mounting an automotive sensor directly to the wall section of a part to be detected, without using screws, and also mounting a pressure detector directly to a pressure air passage without using a pressure inlet pipe.

The non-circular sensor mounting hole is provided for inserting a part of the sensor housing into the wall section of the part to be detected. In the sensor housing the first locking portion (pawl) and the second locking portion (flange) are integrally formed by molding. The housing 1 is allowed to be inserted into the mounting hole under the condition that the pawl is directed to a specific orientation, and, after insertion, is turned through a specific angle. Therefore the pawl is engaged on the inside surface of the wall section. The flange is engaged on the outside surface of the wall section The pawl and the flange are designed to hold the wall section of the part to be detected, thereby mounting the sensor. The projection of the hook is engaged with the recess provided in the sensor housing 1, thus locking the sensor from turning.

5 Claims, 6 Drawing Sheets

SENSOR MOUNTING STRUCTURE AND SEMICONDUCTOR PRESSURE SENSOR FOR MOTOR VEHICLES

BACKGROUND OF THE INVENTION

The present invention relates to a sensor mounting structure for mounting an automotive sensor (e.g., a pressure sensor, a temperature sensor, etc.) and a semiconductor pressure sensor to be used.

There have been used various kinds of sensors for electronically controlling an internal-combustion engine mounted in a motor vehicle. These conventional sensors were attached by screws. For instance, as disclosed in Japanese Unexamined Patent Publication No. Hei 5-172673, brackets are attached in two places on a plastic molding housing to provide the pressure sensor mounting position with a degree of freedom of movement. The pressure sensor is attached by screws in an appropriate position through the bracket and the sensor section and a pressure source are connected by means of a hose.

In recent years, a metal intake air passage, or a so-called intake manifold made of a metal, for use in the internal-combustion engine in motor vehicles is giving way to an intake manifold of synthetic resin. In the case of the synthetic resin manifold, it becomes necessary to form, by insert-molding, a metal part for receiving a mounting screw to fix a sensor housing at the time of molding the intake manifold, resulting in an increased cost.

It is also necessary to insert a metal bushing on the housing side to prevent biting and loosening of the screw, which also increases the cost.

To facilitate the mounting of the sensor, therefore, there has been proposed a method of dispensing with a bracket and a hose for introducing the pressure from the pressure source, and fixing the sensor directly on the pipe wall of the intake air passage in place of using the screw.

For instance, according to Japanese Unexamined Patent Publication No. Sho 63-215847, a cylindrical section larger in diameter than the sensor body is employed as the sensor mounting section. On the sensor side is provided a locking flange section of a non-circular contour; and an insertion hole is formed in the cylindrical section to insert the sensor. The insertion hole has a locking hole for inserting the locking flange portion of the sensor at a specific angle in the inlet side and, after insertion, the locking flange section is allowed to turn. The locking flange section of the sensor is locked by a spring force on the inside surface of the locking hole to thereby mount the sensor.

This method, however, requires insertion of a spring member beside the sensor body into the sensor mounting section (cylindrical section), which will increase both cost and labor for assembling.

In Japanese Unexamined Patent Publication No. Sho 63-215846, disclosed is the sensor mounting structure that a cylindrical portion is provided as a sensor mounting section which is larger than the sensor body; on either one of the cylindrical portion and the sensor, there is provided an elastic locking leg which is elastically deformable in the radial direction of the cylindrical portion; on the other, a fixed locking portion is provided to lock and lock the sensor from turning in engagement with the elastic locking leg in a free state; and the elastic locking leg is pressed into contact with the fixed locking portion by the force of a disk spring, to thereby prevent accidental removal of the sensor. In this case also, it becomes necessary to form a cylindrical portion as the sensor mounting section, and to insert a spring member beside the sensor body into the sensor mounting section (cylindrical portion), resulting in an increased cost and labor for assembling.

In Japanese Unexamined Patent Publication No. Hei 10-122914 there has been proposed a sensor mounting structure in which an elastic member (e.g., a rubber member) having a front end flange and a rear end flange is attached on the projecting portion of a sensor; the elastic member together with the projecting portion of the sensor is inserted, with the rear end flange left non-inserted, into a through hole provided in a member to be attached. After insertion, the front end flange is locked on the inside surface of the member to be attached, while the rear end flange is locked on the outside surface of the member to be attached. The example given above requires an elastic member for mounting the sensor, which increases the number of component parts, and furthermore requires a process for mounting the elastic member to the projecting portion of the sensor prior to mounting the sensor.

It is, therefore, an object of the present invention first to provide a sensor mounting structure for motor vehicles which facilitates mounting the sensor to the wall of the intake manifold while dispensing with screwing of the sensor, and further to decrease the number of component parts and to simplify the structure as compared with a conventional mounting structure system which needs no screws.

It is another object to provide a semiconductor pressure sensor capable of directly mounting an intake air pressure sensor which is one of automotive sensors, to the wall of the intake manifold, and installing the pressure detecting gauge of the sensor into the intake passage while dispensing with a pressure inlet pipe.

It is further another object to provide a sensor mounting structure capable of preventing water formed by condensation from icing in the pressure detecting section to maintain reliability of the pressure detecting section when the semiconductor pressure sensor is mounted directly on the wall of the intake manifold, particularly when the semiconductor pressure sensor is mounted with the pressure inlet port in a horizontal or nearly horizontal position.

BRIEF SUMMARY OF THE INVENTION

To accomplish the above-described objects, the sensor mounting structure for motor vehicles of the present invention has basically the following configuration.

According to the first invention, in the sensor mounting structure for motor vehicles for mounting, on a wall section of a part to be detected, a sensor for detecting a physical value necessary for operating a motor vehicle, characterized in that said sensor is mounted by: providing a sensor mounting hole of non-circular contour for inserting a part of said sensor into said wall section of said part to be detected; and forming in a housing of said sensor, integrally with said housing by molding, first locking portion allowed said sensor to insert into said mounting hole in a specific orientation and engaged on the wall surface which faces the inside of the part to be detected by turning through a specific angle after insertion, and second locking portion engaged on the wall surface which faces the outside of the part to be detected ; and holding said wall section of said part to be detected between said first and second locking portions.

According to the above-described configuration, when the sensor is attached on the wall section of a part to be detected, the first locking portion provided on the sensor housing is directed to a specific orientation, aligning both the first locking portion and the mounting holes made in the wall section of the part to detected. In this state, the sensor housing is inserted into the mounting holes thus aligned (until the first locking portion passes through the outlet of the mounting hole, or, in other words, until the second locking portion contacts the wall surface which faces the outside of the part to be detected). Thereafter, as the sensor housing is turned through a specific angle, the first locking portion is engaged on the wall surface which faces the inside of the part to be detected, while the second locking portion is engaged on the wall surface which faces the outside of the part to be detected. The first and second locking portions hold the wall section of the part to be detected, thus directly mounting the sensor on the wall section of the part to be detected, without using the screw.

According to the second invention, a housing making up a sensor body is formed to be attached on the wall section of the part to be detected, with a gauge portion thereof disposed directly on the part to be detected, and is of a two-piece structure which includes a sensor holder having a pressure detecting semiconductor gauge housing section, a housing section for holding a circuit substrate mounted with an electronic circuitry and a connector, and a cylindrical cap in which the sensor holder is inserted, with the connector mounted outside; and a pressure inlet port is formed by the shape of semiconductor gauge housing section of the sensor holder and the cap.

According to the above-described configuration, the sensor body (sensor housing) is formed simply by inserting the sensor holder having an electronic circuit section and a semiconductor gauge into the cap with the connector portion left outside, and the semiconductor gauge ( pressure detector) housing section is located in the pressure inlet port, thereby enabling direct detection of a pressure without a pressure inlet pipe. Besides, the semiconductor gauge, if disposed directly into the part to be detected (e.g., the intake manifold), is protected by the cap positioned around the gauge, to thereby insure reliability of the pressure sensor.

In the sensor mounting structure for motor vehicles according to the third invention, the pressure sensor is attached directly on the intake manifold of the internal-combustion engine through the mounting hole provided in the pipe wall of the intake manifold; and the pressure inlet port of the sensor opens directly into the intake manifold. A gauge which responds to the pressure is mounted in this pressure inlet port.

In this sensor mounting structure, the pressure inlet port of the pressure sensor is mounted horizontally or nearly horizontally; in this mounting state, the gauge is disposed in the upper part of the inside of the pressure inlet port.

In the configuration in which the pressure sensor is mounted directly on the pipe wall of the intake manifold with the pressure detector (gauge portion) exposed into the intake manifold, the pressure sensor has such a drawback that if the pressure inlet port is located horizontally or nearly horizontally, water generated as a result of sweating in the intake manifold enters the pressure inlet port and freezes to give damage to the gauge. However, when the gauge is disposed in the upper part of the pressure inlet port as stated in the above-described configuration, water caused by sweating will not enter the gauge. It is, therefore, possible to protect the gauge from damage resulting from icing.

DETAILED DESCRIPTION OF PREFERRED EMBODIMENTS OF THE INVENTION

Preferred embodiments of the present invention will be explained with reference to the accompanying drawings of a semiconductor pressure sensor for one example.

Figure 1:
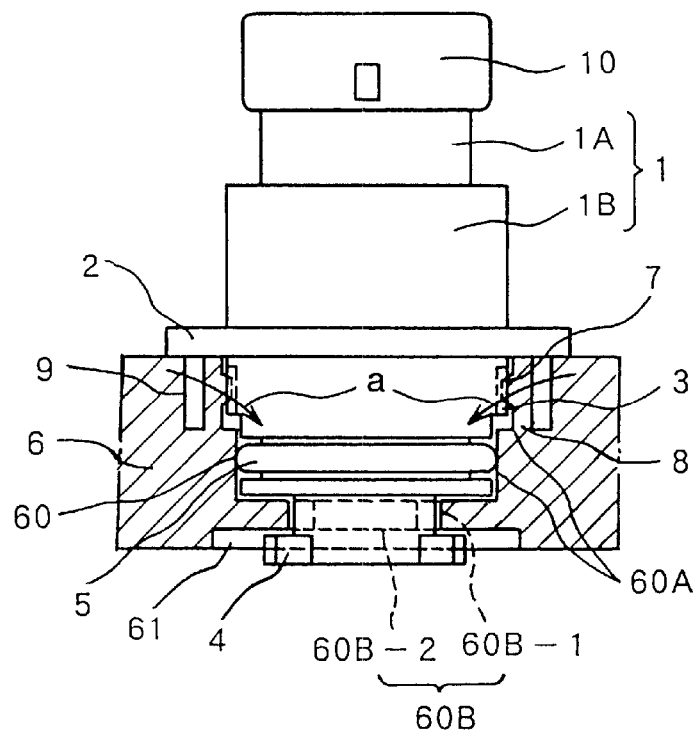
FIG. 1 is an explanatory view showing, in section, a mounting hole provided in the intake manifold of an internal combustion engine for motor vehicles.
Figure 2:
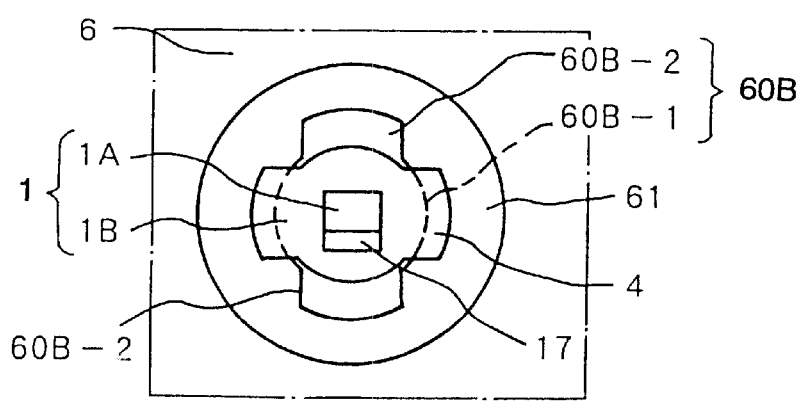
FIG. 2 is a bottom view of FIG. 1.
Figure 3:
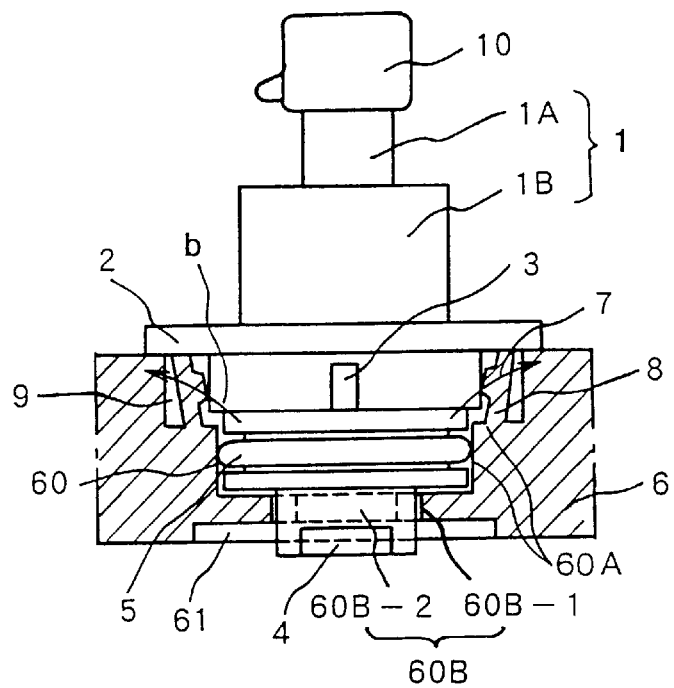
FIG. 3 is an explanatory view showing the sensor in the course of mounting.
Figure 4:
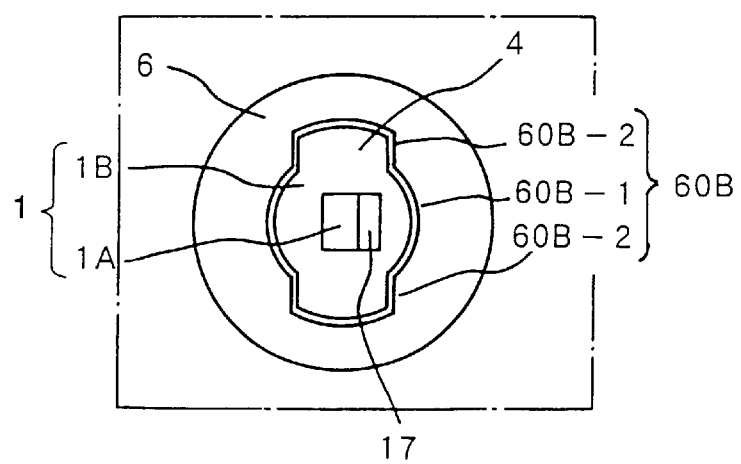
FIG. 4 is a bottom view of FIG. 3.
Figure 5:
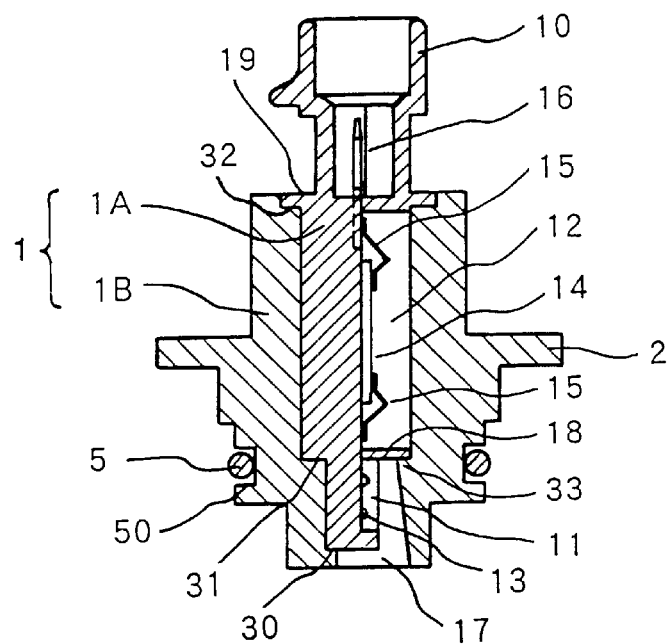
FIG. 5 is a longitudinal sectional view of the semiconductor pressure sensor for use in the aforesaid embodiment.
Figure 6:
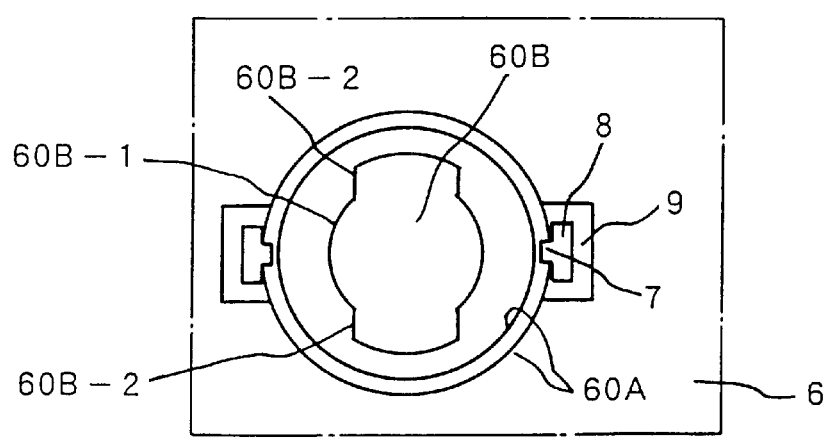
FIG. 6 is a top view of the mounting hole for fixing the pressure sensor.

FIG. 1 is an explanatory view showing one embodiment of the sensor mounting structure according to the present invention, partly sectioned at the mounting hole made in an intake manifold of an internal-combustion engine for motor vehicles; FIG. 2 is a bottom vied thereof; FIG. 3 is an explanatory view showing the sensor on the way of mounting; FIG. 4 is a bottom view thereof; FIG. 5 is a longitudinal sectional view of the semiconductor pressure sensor; and FIG. 6 is a top view of the mounting hole in which the pressure sensor is fixed.

First, referring to FIGS. 1, 3 and 5, the structure of the overall housing which is the body of the semiconductor pressure sensor will be explained. The whole body of the housing 1 is separated largely into two parts as shown in FIG. 5; one is a sensor holder 1A including a connector 10, while the other is a cylindrical cap 1B containing the sensor holder 1A inserted therein. The sensor holder 1A and the cap 1B are both produced through a synthetic resin molding process.

The sensor holder 1A is a base called a molded case for mounting and holding a chip 13 including the semiconductor gauge for pressure detection and such an electronic circuit as an amplifier circuit, and a circuit substrate 14 to be prepared and mounted outside when needed.

On one side of this sensor holder 1A there are formed a pocket 11 for housing the semiconductor gauge and the chip (pressure detector) 13 of the amplifier circuit, and a pocket 12 for housing a circuit substrate 14. The chip 13 is attached in the pocket 11, while the circuit substrate 1, in the pocket 12.

The chip 13 making up the semiconductor gauge is a millimeter-order microchip for use as a capacitance type sensor formed by for instance surface micromachining, details of which are not shown on the drawing. The principle of the surface micromachining is that the chip 13 is comprised of a first electrode (fixed electrode) formed of a film of aluminum spatter on a single-crystal silicon substrate (on one side) and a diaphragm-type second electrode (movable electrode) formed of an electrically conductive polycrystal silicon and located oppositely to the first electrode over a gap. With the displacement of the second electrode by a pressure, the electric capacitance varies to thereby detect the pressure.

Since the semiconductor gauge can be formed of such a microchip(also termed a semiconductor gauge or a pressure detector) 13, which is directly mounted on, and partly inserted into, the intake manifold of an engine by means of the sensor housing structure and the sensor mounting structure described later, it is possible to detect the pressure by the chip 13.

The sensor holder 1A includes the pocket 11, pocket 12 and connector 10, which are arranged in order of mention as viewed from the connector 10 side at the rear. Between the pocket 11 and the pocket 12 a partition wall (a plate-like projection) 18 is formed integrally with the sensor holder 1A to separate these pockets from each other.

The cap 1B is a cylindrical type, in which an axial through space is provided to insert the sensor holder 1A therein. On the inside wall of the through space there are provided step portions 30, 31 and 32 to engage with the sensor holder 1A. A locking portion 19 which engages with the step portion 32 is flange-shaped and disposed between the connector 10 of the sensor holder 1A and the pocket 12. In the cap 1B, there is formed a receiving portion (step portion) 33 for receiving a partition wall 18 when the sensor holder 1A is inserted. The sensor holder 1A, when inserted into the cap 1B, is bonded to the cap 1B. At this time, the partition wall 18 also is bonded to the receiving portion 33 of the cap 1B, thereby separating the pocket 11 from the pocket 12 while keeping airtightness.

A pressure inlet portion 17 is formed by the shape of the pocket (semiconductor gauge housing section) 11 and the forward end of the cap 1B.

The pockets 11 and 12 of the sensor holder 1A are filled with gel for protection of the pressure detector (chip) 13 and the circuit substrate 14. The gel in the pocket 11 is phlorosilicone gel which has excellent resistance to chemicals such as water generated in the intake manifold, gasoline, and acid, and is charged into the pocket 11 by injection.

On the other hand, filled in the pocket 12 is a dimethyl silicone gel for protection of the circuit substrate 14. The circuit substrate 14, not appearing into the pressure inlet port 17, is not affected by water, gasoline, and acid, and therefore it is unnecessary to take the chemical resistance into consideration. The pockets 11 and 12 may be disposed either on the same surface or on a different surface; and furthermore it is unnecessary to separate the pocket 12 from the pocket 11 by the partition wall if only the pressure detector and the circuit substrate are protected with the phlorosilicone gel having a high chemical resistance.

The chip 13 used as the pressure detector, external circuit substrate 14, and connector 10, are electrically connected by bonding a lead wire 15 between terminals of lead frames thereof. At the pressure detector 13, the amount of deflection of the gauge which moves in response to the intake manifold pressure is changed into an electric signal, which is amplified by an amplifier circuit, and then can be take out as a sensor output from a terminal 16 of the connector 10.

Next, an explanation will be given of the sensor mounting structure for mounting the pressure sensor to the pipe wall (wall section) 6 of the intake manifold (a part to be detected).

As shown in FIGS. 1 to 6, mounting holes 60 for mounting the pressure sensor are formed in the pipe wall 6 of the intake manifold. The mounting holes 60 include a round hole 60A for receiving the cylindrical barrel portion of the sensor housing 1 and a hole 60B for receiving the forward end of the sensor housing 1 to thereby lead the lock pawl 4 on the forward end of the sensor housing 1 into the round recess 61 in the inside wall of the intake manifold 6.

The hole 60B is a non-circular sensor mounting hole comprising a central portion 60B-1 which fits on the outside diameter of the forward end of the sensor housing 1 and a lock pawl insertion hole 60B-2 extended outwardly from the central part at a spacing of 180 degrees. Hereinafter the hole 60B, being of a keyhole type, will be called a keyhole. On the peripheral edge of the hole 60A of the intake manifold (wall section) 6, two engaging hooks (elastic members) 8 are arranged at a 180-degree spacing. There is formed a groove 9 which allows outward elastic deformation of the hooks 8. Inside the hooks 8, tapered projections 7 are formed to fit in recesses 3 formed in the barrel portion of the sensor housing 1. The recesses 3 are arranged at a spacing of 180 degrees. It should be noticed that the number and arrangement of the hooks 8 and the recesses 3 are not limited thereto. On the barrel portion of the sensor housing 1 an O-ring 5 is attached to keep airtightness when the sensor housing 1 is inserted into the mounting hole 60. The O-ring 5 is fitted in an annular groove 50 formed in the outer periphery of the sensor housing 1.

The lock pawl 4 stated above functions as the first locking portion, which, when positioned in a specific orientation, can be inserted into the keyhole 60B of the mounting hole 60 and, after insertion, is turned through a specific angle to be engaged with the inside surface (a surface facing inside) of the wall section 6 of the intake manifold. That is, the lock pawl 4 is engaged with the inside surface of the wall section 6 of the intake manifold to lock the sensor housing 1 from moving out after the sensor housing 1 is turned through the specific angle (e.g., 90 degrees). To ensure this operation, the hole 60B has a configuration of a keyhole.

On the barrel portion of the sensor housing 1, the second locking portion 2 is formed of a flange to lock the sensor on the outside surface (a surface facing outside) of the wall section 6 of the intake manifold when the sensor is inserted as deep as the mounting position in the mounting hole 60.

Next, a method of mounting the sensor of the present example will be explained with reference to FIGS. 1 to 4.

First, as shown in FIGS. 3 and 4, the sensor housing 1 is inserted and positioned in a specific orientation so that the first locking portion (lock pawl) 4 may be inserted into the keyhole 60B. At this time, the recess 3 provided in the sensor housing 1 is positioned 90 degrees off the hook 8 arranged in the mounting hole 60. The barrel portion of the sensor housing 1 in which position the recess 3 is formed is larger in diameter than the spacing between the projections 7, 7 of the pair of hooks 8 disposed at a spacing of 180 degrees. Furthermore, since the projection 7 is tapered, the hook 8 is pushed to open outwardly as indicated by the arrow b by the elasticity of the hook caused when the sensor housing 1 is pushed in.

Next, as shown in FIGS. 1 and 2, when the sensor housing 1 is turned through a specific angle (90 degrees in this case), the recess 3 fits on the projection 7 of the hook 8; and the hook 8, as indicated by the arrow a in FIG. 1, is moved back to the original position by the spring characteristics, thereby locking the sensor housing 1. When the sensor housing 1 is turned 90 degrees, the lock pawl 4 turns together with the sensor housing 1 in the recess 61 formed in the inside wall of the intake manifold.

In this state, the lock pawl (first locking portion) of the sensor housing 1 and the flange (second locking portion) 2 hold the intake manifold wall 6, to thereby restrict the axial movement of the sensor.

If, in such a state of mounting, there is not adopted such a fixing system that the first and second locking portions (lock pawl 4 and the flange 2) are pressed by the spring force particularly against the intake manifold (wall section 6), a pull caused by a negative pressure built up in the intake manifold works to the sensor housing 1 when the internal-combustion engine is operated; and therefore the flange 2 is pressed against the outside surface of the intake manifold, thus securely fixing the sensor without looseness. Also, when a pull acts on the sensor (housing 1) because a positive pressure is present in the passage or because a harness connected to the connector 10 is pulled, the lock pawl 4 located inside works as a stopper to prevent accidental removal of the sensor. In case a force is applied in the direction of rotation because of vibration from the internal-combustion engine, first the vibration in the direction of rotation is absorbed by the O-ring 5, and therefore the force working on the sensor housing 1 is decreased and furthermore the housing 1 which is fixedly locked from turning will not turn.

When the sensor housing 1 is fixed in the mounting hole 60, a space between the sensor housing 1 and the mounting hole 60 is sealed by the O-ring 5, thus enabling to provide airtightness of the intake manifold. In this case, other than the O-ring may be attached to the cap 1B; for instance, a bellows-shaped rubber is inserted or attached on the cap 1B, the rubber is pressed against the inside surface of the mounting hole 60, thus enabling to provide the airtightness.

When the projection 7 of the hook 8 is fitted in the recess 3, a stress is not constantly added to the hook 8, and therefore there will never occur such a problem as creep and relaxation of stress of the hook 8 having a spring characteristic.

The sensor, when needed to be removed from the intake manifold, can be pulled off by turning the sensor housing 1 in the reverse direction of mounting to disengage the projection 7 of the hook 8 (arrow b in FIG. 3) from the recess 3 until the sensor housing 1 comes in the position shown in FIGS. 3 and 4.

Figure 7:
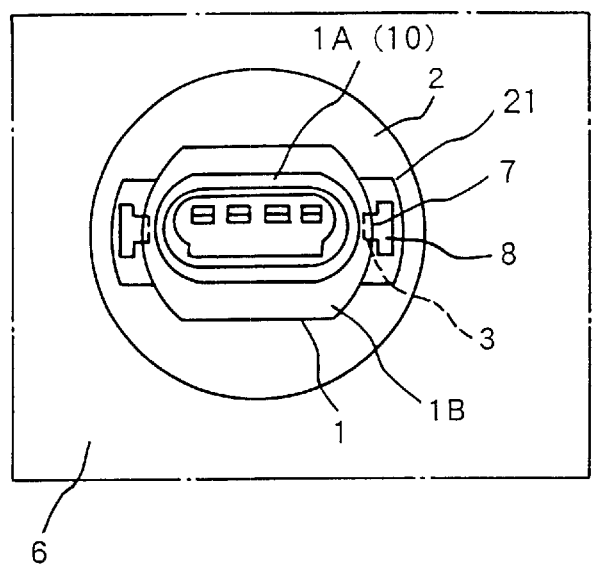
FIG. 7 is a top view of the sensor mounting structure of the present embodiment.

In this case, as shown in FIG. 7 (a top view of the sensor mounting structure of the present invention), it is advised to provide a peep window 21 in the flange 2 of the sensor housing 1 for peeping the fitting section where the projection 7 of the hook 8 fits in the recess 3 formed in the housing 1 side; and through this peep window 21, a jig for spreading the hook 8 is inserted to turn the housing 1 a little to remove the projection 7 from the recess 3. Then, after removing the jig, the housing 1 can easily be turned to pull out to the position before insertion.

In the above-described example, the sensor explained is the intake manifold pressure sensor. However, it is to be noted that the sensor is not limited thereto and may be an intake air temperature sensor, a cooling water temperature sensor to be used in other than the intake manifold, and various other kinds of sensors to be mounted on the exhaust manifold.

According to the present embodiment, the present invention has the following advantages.

(1) Since the sensor for motor vehicles can be attached without using a screw, the number of component parts for attaching the sensor can be reduced; particularly when the intake manifold or other is produced of a synthetic resin, it is possible to easily and at a low cost install the sensor to the intake manifold or other produced of the synthetic resin.

(2) Since the pressure sensor is attached on the intake manifold and the semiconductor gauge for pressure detection is exposed directly into the intake manifold, no pressure inlet pipe is needed. Besides, if a circuit substrate such as an electronic circuit is mounted in the sensor housing, entry of water and gasoline can be prevented, thereby enabling to provide sensor reliability.

Figure 8:
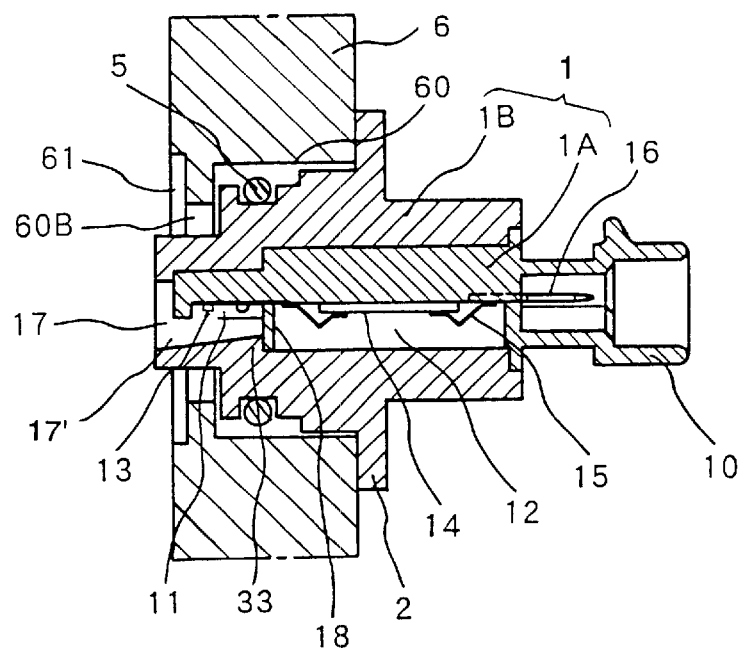
FIG. 8 is a longitudinal sectional view showing an example of mounting the intake manifold installed at an angle different from that in FIG. 1.

FIG. 8 gives an example of the pressure sensor of the present embodiment mounted on the intake manifold at an angle different from FIG. 1.

The pressure sensor housing 1 is attached with the pressure inlet port 17 positioned horizontally or nearly horizontally. In this mounting state, the gauge (chip 13) which serves as the pressure detector is placed in the upper part of the interior of the pressure inlet port 17.

Within the intake manifold, water vapor is sometimes condensed. When the sensor housing 1 is mounted vertically as shown in FIG. 1, the pressure inlet port 17 faces down to allow smooth discharge of water.

Actually, however, the sensor housing 1 is in some cases required to be mounted horizontally or nearly horizontally. In this case, the pressure inlet port 17 is positioned horizontally or nearly horizontally, causing water resulting from seating to enter the pressure inlet port 17. If the water enters, and freezes in, the gauge (chip 13) which is the pressure detector, the pressure detector is liable to breakdown. According to the present embodiment, in the pressure detecting gauge 13 arranged in the upper part in the pressure inlet port 17, water will run down if present in the pressure inlet port 17. Furthermore, as shown in FIG. 8, the interior of the pressure inlet port 17 is provided with an inclination 17' to allow smooth discharge of water into the intake manifold (intake air passage), thus enabling to prevent giving damage of icing to the gauge.

Figure 9:
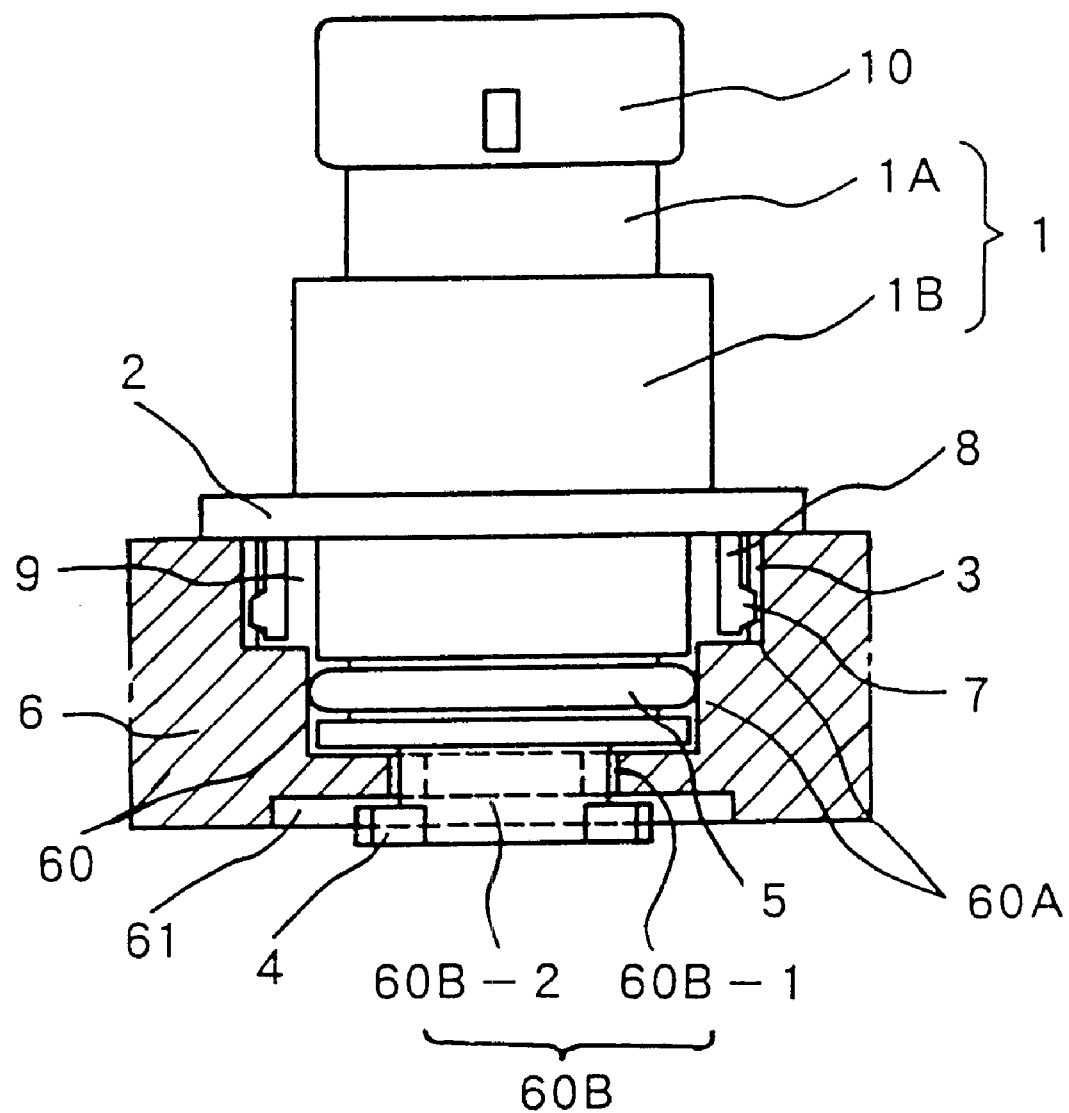
FIG. 9 is an explanatory view showing the sensor mounting state of another embodiment of the present invention.

FIG. 9 shows another embodiment of the present invention, which differs from the embodiments in FIGS. 1 to 8 in the respect that the hook 8 with the projection 7 and the groove 9 are provided on the sensor housing 1 side, and the recess 3 is formed in the mounting hole 60 side. According to this configuration also, it is possible to lock the sensor housing similarly to the aforesaid embodiment.

Figure 10:
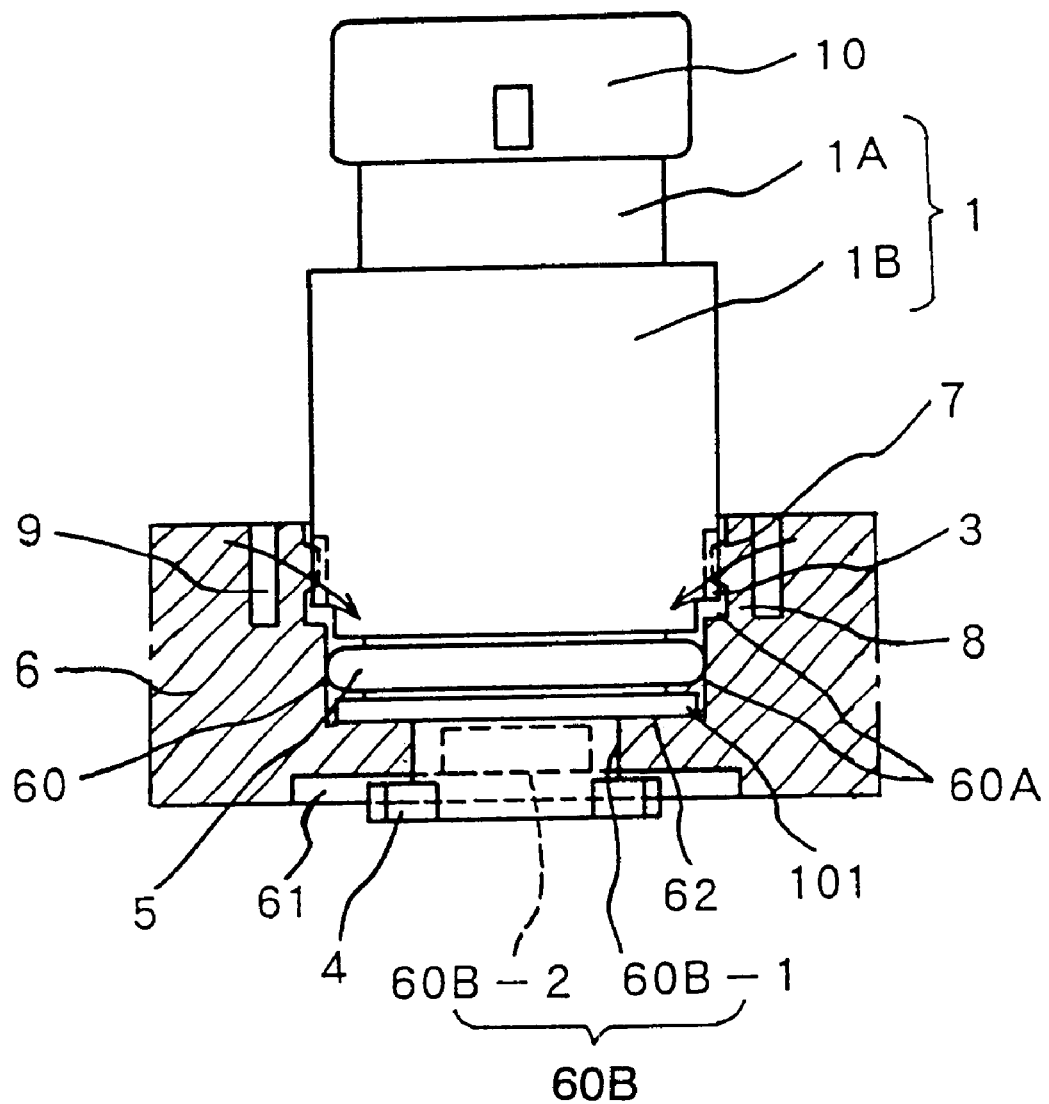
FIG. 10 is an explanatory view showing the sensor mounting state of another embodiment of the present invention.

FIG. 10 also shows another embodiment of the present invention, in which the flange 2 is dispensed with, and in place of the flange 2 a part 101 of the barrel portion of the cap 1B of the sensor housing 1 is engaged with a stepped surface 62 facing outwardly in a mounting hole 60. The part 101 of the cap 1B and the lock pawl 4 are designed to hold the intake manifold wall surface around the keyhole 60B.

According to the present invention, as heretofore described, the automotive sensor can easily be installed to the intake manifold wall or other without using screws. Besides, it is possible to realize the sensor mounting structure which can reduce a component count and simplify the structure as compared with a conventional mounting structure system which dispenses with screws.

Furthermore, it is possible to provide a semiconductor pressure sensor which directly attaches the intake air pressure sensor which is one of automotive sensors, to the intake manifold wall, and moreover to expose into the intake air passage the pressure detecting gauge of the sensor which can dispense with the pressure inlet pipe.

Furthermore, when the semiconductor pressure sensor is attached directly to the intake manifold wall, particularly when the semiconductor pressure sensor is attached with the pressure inlet port set horizontally or nearly horizontally, it is possible to prevent water caused by condensation from icing on the semiconductor gauge, thus preventing impairing the pressure detector.

What is claimed is:

1. A sensor mounting structure for mounting, on a wall section of an intake pipe of an internal combustion engine of a motor vehicle a sensor for sensing a physical value of an interior of said intake pipe necessary for operating said motor vehicle, wherein said sensor is mounted by:

providing in said wall section a sensor mounting hole of non-circular contour for inserting a part of said sensor into said intake pipe;

forming in a housing a said sensor a first locking portion which allows said sensor to be inserted into said mounting hole in a specific orientation and engaged with an inner surface of said wall section, by turning said sensor through a specific angle after insertion;

forming in said housing of said sensor a second locking portion for engaging with an outer surface of said wall section by inserting said sensor;

holding said wall section of said intake pipe between said first and second locking portions; and setting said sensor so that a negative pressure of said intake pipe acts on said sensor, whereby said second locking portion is pressed against said outer surface of said wall section.

2. The sensor mounting structure according to claim 1, wherein:

an elastic member with a projection is formed on one of said mounting hole and said sensor housing, with a recess on the other of said mounting hole and said sensor housing in which said projection can be engaged; and said projection of said elastic member and said recess is configured such that, after insertion into said mounting hole, said sensor is turned through a specific angle to fit in a locking position.

3. The sensor mounting structure according to claim 1, wherein said sensor housing and said wall section of said intake pipe are molded of a synthetic resin.

4. A sensor mounting structure for motor vehicles according to claim 1, wherein said sensor senses one of intake air pressure and intake air temperature of an internal-combustion engine.

5. A sensor mounting structure for motor vehicles according to claim 1, wherein:

said first locking portion has a non-circular projection which conforms to the non-circular contour of said mounting hole; and said second locking portion is configured as a flange.

* * * * *